(12) United States Patent
Morita et al.

(10) Patent No.: US 9,905,059 B2
(45) Date of Patent: Feb. 27, 2018

(54) DATA TRANSFER SYSTEM, DATA TRANSMISSION DEVICE, AND DATA RECEPTION DEVICE

(71) Applicant: Panasonic Intellectual Property Management Co., Ltd., Osaka (JP)

(72) Inventors: Junichi Morita, Tokyo (JP); Naganori Shirakata, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/336,476

(22) Filed: Oct. 27, 2016

(65) Prior Publication Data

US 2017/0132852 A1    May 11, 2017

(30) Foreign Application Priority Data

Nov. 9, 2015  (JP) .................................. 2015-219499

(51) Int. Cl.
   *G07C 5/00*    (2006.01)
   *G07C 5/08*    (2006.01)
   *H04B 10/118*  (2013.01)
   *H04B 10/116*  (2013.01)

(52) U.S. Cl.
   CPC ........... *G07C 5/008* (2013.01); *G07C 5/0825* (2013.01); *H04B 10/116* (2013.01)

(58) Field of Classification Search
   CPC ..... G07C 5/008; G07C 5/0825; H04B 10/116
   See application file for complete search history.

(56) References Cited

U.S. PATENT DOCUMENTS

2014/0295759 A1* 10/2014 Nishioka ............. H04M 1/7253
                                                              455/41.2
2015/0336524 A1* 11/2015 Larner .................... B60R 11/04
                                                              293/120

FOREIGN PATENT DOCUMENTS

| JP | 2013-117778 A | 6/2013 | |
| JP | 2013117778 A * | 6/2013 | |
| JP | WO 2013136702 A1 * | 9/2013 | .......... H04M 1/7253 |

* cited by examiner

*Primary Examiner* — Shi K Li
*Assistant Examiner* — Mina Shalaby
(74) *Attorney, Agent, or Firm* — Seed IP Law Group LLP

(57) ABSTRACT

A data transfer system includes: a data transmission device; and a data reception device. The data transmission device includes a visible-light reception controller that receives visible-light data from the data reception device, a memory from which accumulated data is read out in a case where the visible-light reception controller receives the visible-light data, and a millimeter-wave communication controller that, in a case where the visible-light reception controller receives the visible-light data, establishes wireless connection for communication with the data reception device using a frequency in a millimeter band, and transmits the readout data to the data reception device.

12 Claims, 9 Drawing Sheets

DATA TRANSFER SYSTEM, DATA TRANSMISSION DEVICE, AND DATA RECEPTION DEVICE

BACKGROUND

1. Technical Field

The present disclosure relates to a data transfer system, a data transmission device, and a data reception device.

2. Description of the Related Art

In recent years, drive recorders mounted on taxis and vehicles for business use such as transportation have been widely used. For such drive recorders, image quality has enhanced and costs have been reduced. There has been an increased demand for using driving data recorded by a drive recorder not only to specify a cause of an accident but also to take other safety measures and accident prevention, for example. In view of these situations, drive recorders are expected to be mounted on general-purpose vehicles.

Under current situations, driving data recorded by a drive recorder is accumulated in a recording medium (e.g., a memory card) of the drive recorder and is then transferred from the recording medium to a computer in, for example, an office.

In the situations of application described above, however, a user removes the recording medium from the drive recorder and connects the recording medium to the computer. This process is a burden on the user and causes the possibility of a loss of the recording medium.

Japanese Unexamined Patent Application Publication No. 2013-117778 describes a technique in which driving data of a recording medium of a drive recorder is transferred to a computer through wireless LAN communication without removal of the recording medium.

SUMMARY

In the technique of Japanese Unexamined Patent Application Publication No. 2013-117778, however, the time necessary for transferring driving data is not taken into consideration.

One non-limiting and exemplary embodiment provides a data transfer system, a data transmission device, and a data reception device that can transfer data at high speed.

In one general aspect, the techniques disclosed here feature a data transfer system including: a data transmission device; and a data reception device. The data transmission device includes a visible-light receiver that determines whether to receive visible-light data from the data reception device or not, a first memory from which accumulated data is read out in a case where the visible-light receiver receives the visible-light data, and a first millimeter-wave communicator that, in a case where the visible-light receiver receives the visible-light data, establishes wireless connection for communication with the data reception device using a frequency in a millimeter band, and transmits the readout data to the data reception device. The data reception device includes a visible-light transmitter that transmits the visible-light data to the data transmission device, a second millimeter-wave communicator that establishes wireless connection for communication with the data transmission device using a frequency in a millimeter band, and receives data transmitted from the data transmission device, and a second memory that stores the received data.

It should be noted that general or specific embodiments may be implemented as a system, a device, a method, an integrated circuit, a computer program, a storage medium, or any selective combination thereof.

A data transfer system in an aspect of the present disclosure can transfer data at high speed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

First, prior to description of data transfer systems according to embodiments of the present disclosure, circumstances that led to the data transfer systems according to the embodiments of the present disclosure will be described.

For example, Japanese Unexamined Patent Application Publication No. 2013-117778 describes a technique of transferring driving data of a recording medium of a drive recorder to a computer through wireless LAN communication without removing the recording medium.

Figure 8:
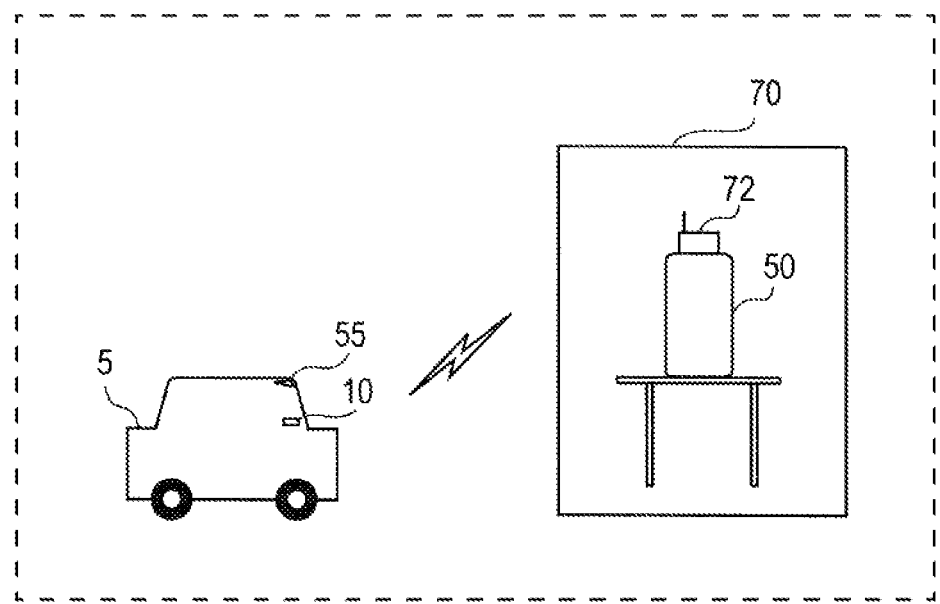
FIG. 8 illustrates a configuration described in Japanese Unexamined Patent Application Publication No. 2013-117778.

Here, the technique of Japanese Unexamined Patent Application Publication No. 2013-117778 will be specifically described with reference to FIG. 8. A vehicle 5 includes a vehicle-mounted unit 10 for recording image data (an example of driving data) in driving captured by a camera 55. On the other hand, a wireless LAN access point 72 and a personal computer (PC) 50 are placed in an office 70.

For example, when the vehicle 5 enters a communication range of the wireless LAN access point 72, connection through a wireless LAN is established between the vehicle-mounted unit 10 and the wireless LAN access point 72 so that data recorded on a memory card of the vehicle-mounted unit 10 is transferred to the PC 50.

Although a standard for the wireless LAN is not clearly described in Japanese Unexamined Patent Application Publication No. 2013-117778, it is assumed that the technique described in this patent publication is based on a standard of a wireless LAN at 2.4 GHz or 5 GHz where the communication range is relatively long and the transparency is high because the wireless LAN access point 72 is placed in the office 70 and the vehicle-mounted unit 10 is, mounted on the vehicle 5 outside the office 70.

Accordingly, even in a case where the standard is IEEE802.11n (at an effective speed of 200 Mbps), which is highest among wireless LAN communications each using a frequency band of 2.4 GHz or 5 GHz, for example, transfer of 32 GB data requires as much as 20 minutes or more. For this reason, although the technique of Japanese Unexamined Patent Application Publication No. 2013-117778 can eliminate a burden in removing and inserting a memory card, a user has to wait for completion of data transfer. Thus, ultimate solutions for reduction of a burden on the user have not been obtained yet.

In view of this, it may be effective to use, as a wireless LAN, millimeter-wave communication (IEEE802.11ad: 60 GHz band) with which high-speed communication can be performed. The millimeter-wave communication enables high-speed communication at an effective speed of 2 Gbps or more, and thus, the transfer of 32 GB data described above can be completed in about two minutes.

However, the millimeter-wave communication has characteristics such as "high directivity (straightness)" and "necessity for line-of-sight communication" and thus, a labor for positioning between the vehicle-mounted unit and the wireless LAN access point is needed.

An aspect of the present disclosure provides a data transfer system that can simplify a labor for positioning in the case of employing millimeter-wave communication and can transfer data at high speed.

First Embodiment

A first embodiment of the present disclosure will be described hereinafter in detail with reference to the drawings.

Figure 1:
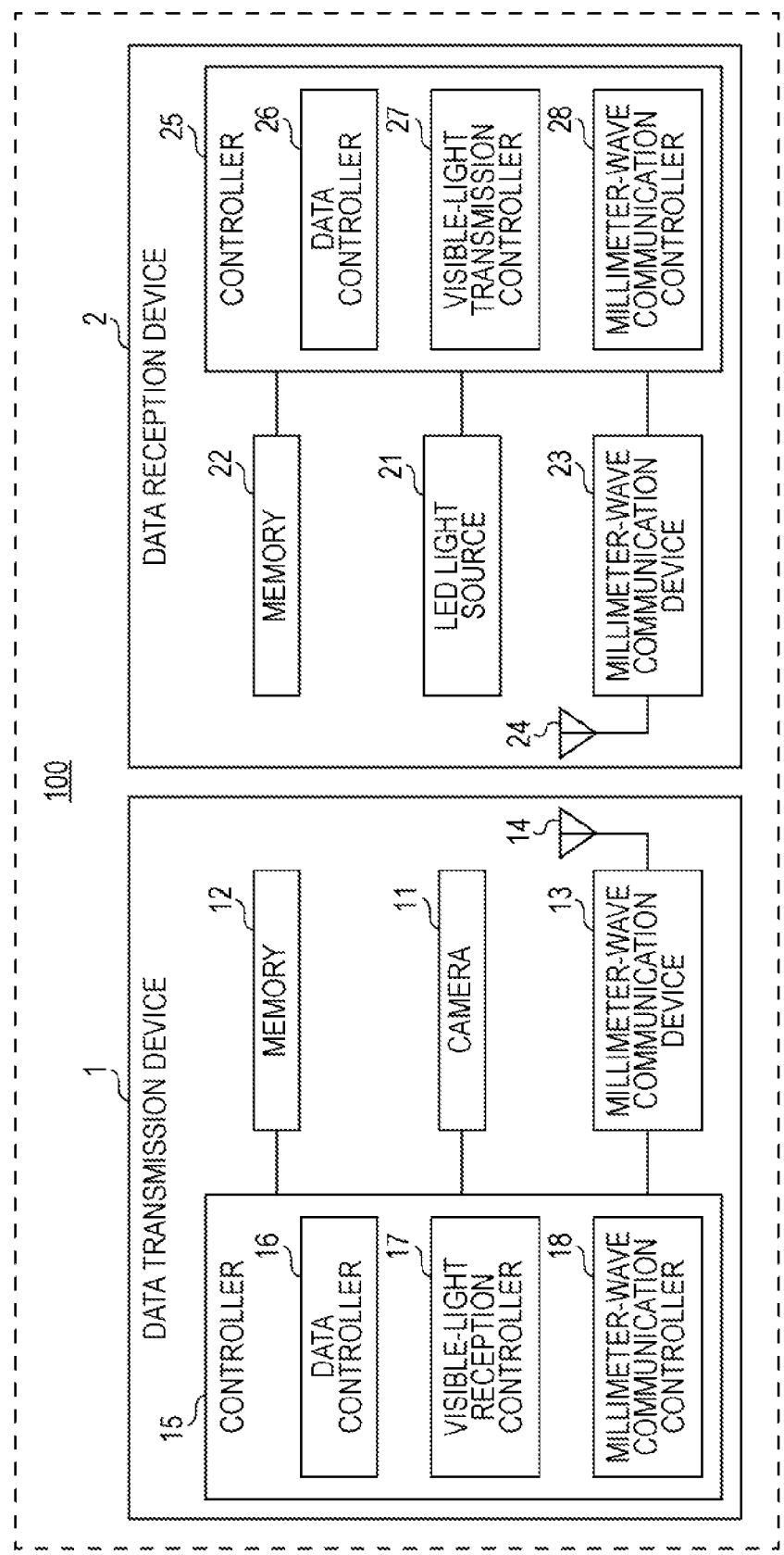
FIG. 1 is a block diagram illustrating an example configuration of a data transfer system according to a first embodiment of the present disclosure.

First, an example configuration of a data transfer system 100 according to the first embodiment will be described with reference to FIG. 1. FIG. 1 is a block diagram illustrating an example configuration of the data transfer system 100 according to the first embodiment.

As illustrated in FIG. 1, the data transfer system 100 includes a data transmission device 1 and a data reception device 2. The data transmission device 1 is, for example, a drive recorder to be mounted on a vehicle. The data reception device 2 is, for example, a wireless LAN access point placed in, for example, a building (e.g., a house or an office).

First a configuration of the data transmission device 1 will be described.

As illustrated in FIG. 1, the data transmission device 1 includes a camera 11, a memory 12, a millimeter-wave communication device 13, an antenna 14, and a controller 15.

The camera 11 is an imaging device that includes a lens and an image sensor, each not shown, and captures, for example, an image around a vehicle (e.g., the front of the vehicle). The camera 11 receives (captures) visible-light data (image data) transmitted from the data reception device 2. The visible-light data is, for example, an ID signal including predetermined information.

In the example of FIG. 1, the camera 11 is included in the data transmission device 1. Alternatively, the camera 11 may be provided outside the data transmission device 1.

The memory 12 is a storage device for storing various types of data, such as a hard disk drive (HDD) or a memory card. The memory 12 stores driving data acquired in driving of the vehicle. The driving data may be, for example, image data captured by the camera 11. The image data may be a still image or a moving image. In the following example, driving data is image data. However, the driving data is not limited to image data.

The millimeter-wave communication device 13 is a wireless communication device that performs wireless communication using a frequency in a millimeter wave band (e.g., a 60 GHz band) in conformity with IEEE802.11ad, for example, through the antenna 14. The millimeter-wave communication device 13 transmits image data stored in the memory 12 to the data reception device 2 through the antenna 14.

The millimeter-wave communication device 13 is placed near an imaging unit (a lens and an image sensor) of the camera 11, for example. The possible communication range of millimeter-wave communication by the millimeter-wave communication device 13 is set at a distance substantially equal to a possible communication range of visible-light communication by the camera 11.

In the data transmission device 1, the camera 11 and a visible-light reception controller 17 may be collectively referred to as a "visible-light receiver," In the data transmission device 1, the millimeter-wave communication device 13, the antenna 14, and a millimeter-wave communication controller 18 may be collectively referred to as a "millimeter-wave communicator."

The controller 15 is a control device such as a processor for executing various types of information processing. The controller 15 includes a data controller 16, the visible-light reception controller 17, and the millimeter-wave communication controller 18.

The data controller 16 performs, for example, control of storing image data captured by the camera 11 in the memory 12 and control of reading out the stored image data from the memory 12.

The visible-light reception controller 17 receives visible-light data through the image sensor of the camera 11, for example.

A possible communication range of visible-light communication by the visible-light reception controller 17 is set at a distance substantially equal to a possible communication range of millimeter-wave communication by the millimeter-wave communication device 13.

The millimeter-wave communication controller 18 switches the millimeter-wave communication device 13 between an on state (also referred to as a startup state) and an off state (also referred to as a sleep state), for example.

For example, the millimeter-wave communication controller 18 switches the millimeter-wave communication device 13 to the on state and then performs wireless communication with the data reception device 2 to enable wireless communication using a frequency of millimeter waves (e.g., IEEE802.11ad: 60 GHz band). The wireless connection may be implemented by, for example, beamforming.

For example, after having performed wireless connection with the data reception device 2, the millimeter-wave communication controller 18 controls the millimeter-wave communication device 13 in order to transmit image data read out from the memory 12 to the data reception device 2.

The data transmission device 1 only needs to include the camera 11, the memory 12, the millimeter-wave communication device 13, the antenna 14, and the controller 15, and is not limited to a drive recorder.

A configuration of the data reception device 2 will now be described.

As illustrated in FIG. 1, the data reception device 2 includes an LED light, source 21, a memory 22, a millimeter-wave communication device 23, an antenna 24, and a controller 25.

The LED light source 21 is a light-emitting device that transmits visible-light data by regularly lighting an LED. The LED light source 21 is, for example, a white lighting, an internally illuminated sign, or a liquid crystal display.

Although the LED light source 21 is included in the data, reception device 2 in FIG. 1, the LED light source 21 may be placed outside the data reception device 2.

The memory 22 is a storage device for storing various types of data, such as an HDD or a memory card. The memory 22 stores image data received from the data transmission device 1 through millimeter-wave communication.

The millimeter-wave communication device 23 is a wireless communication device that performs wireless communication using a frequency in a millimeter-wave band (e.g., a 60 GHz band) in conformity with IEEE802.11ad, for example, through the antenna 24. The millimeter-wave communication device 13 receives image data transmitted from the data transmission device 1 through millimeter-wave communication via the antenna 24 and outputs the received image data to the controller 25.

The millimeter-wave communication device 23 is placed near the LED light source 21, for example. The possible communication range of millimeter-wave communication by the millimeter-wave communication device 23 is set at a distance substantially equal to a possible communication range of visible-light communication by the LED light source 21.

The controller 25 is a control device such as a processor for executing various types of information processing. The controller 25 includes a data controller 26, a visible-light transmission controller 27, and a millimeter-wave communication controller 28.

The data controller 26 performs, for example, control of storing image data received by the millimeter-wave communication device 23 in the memory 22 and control of reading out the stored image data from the memory 22.

The visible-light transmission controller 27 controls the LED light source 21 in order to transmit visible-light data, for example. The LED light source 21 is controlled by the visible-light transmission controller 27 to emit light to transmit visible-light data.

A possible communication range of visible-light communication by the LED light source 21 is set at a distance substantially equal to a possible communication range of millimeter-wave communication by the millimeter-wave communication device 23.

The millimeter-wave communication controller 28 switches the millimeter-wave communication device 23 between an on state (also referred to as a startup state) and an off state (also referred to as a sleep state).

For example, the millimeter-wave communication controller 28 switches the millimeter-wave communication device 23 to the on state and then performs wireless communication with the data reception device 2 to enable wireless communication using millimeter waves (e.g., IEEE802.11ad: 60 GHz band). The wireless connection may be implemented by, for example, beamforming.

For example, after having performed wireless communication with the data transmission device 1, the millimeter-wave communication controller 28 receives image data the millimeter-wave communication device 23 received from the data transmission device 1.

The data reception device 2 only needs to include the LED light source 21, the memory 22, the millimeter-wave communication device 23, the antenna 24, and the controller 25, and is not limited to a wireless LAN access point In the data reception device 2, the LED light source 21 and the visible-light transmission controller 27 may be collectively referred to as a "visible-light transmitter." In the data reception device 2, the millimeter-wave communication device 23, the antenna 24, and the millimeter-wave communication controller 28 may be collectively referred to as a "millimeter-wave communicator."

Figure 2:
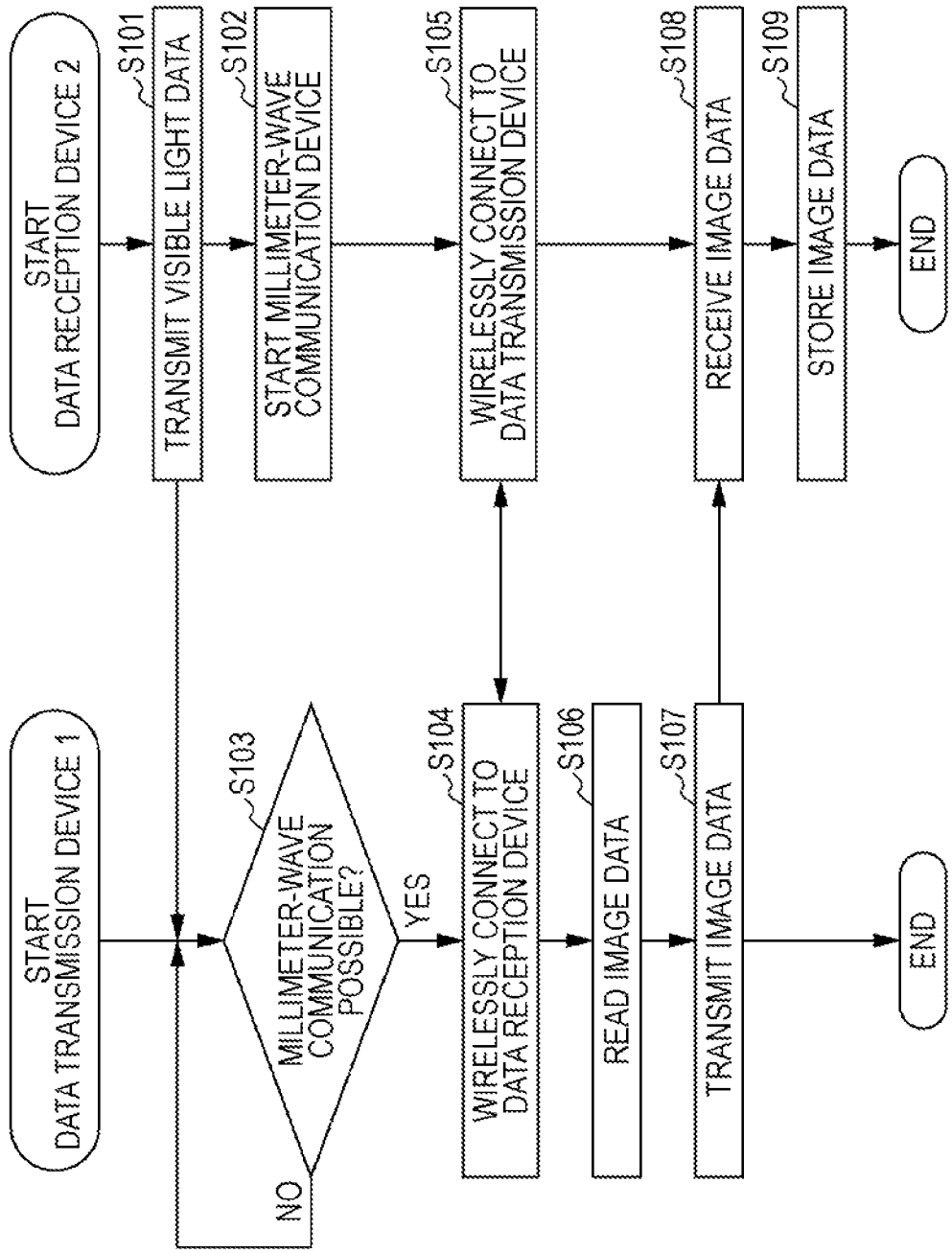
FIG. 2 is a sequence chart illustrating an example of a flow of operation of the data transfer system according to the first embodiment of the present disclosure.

Next, an example of operation of the data transfer system 100 (the data transmission device 1 and the data reception device 2) according to the first embodiment will be described with reference to FIG. 2. FIG. 2 is a sequence chart illustrating an example of a flow of operation of the data transfer system 100 according to the first embodiment of the present disclosure.

In the example described below, a vehicle on which the data transmission device 1 is mounted is parked on a parking lot of a building (e.g., an office or a house) where the data reception device 2 is placed afterdriving.

First, in the data reception device 2, control of the visible-light transmission controller 27 by the controller 25 causes the LED light source 21 to transmit visible-light data (step S101). The transmission of visible-light data is performed before the vehicle is parked on the parking lot of the building, for example.

In the data reception device 2, the millimeter-wave communication controller 28 starts the millimeter-wave communication device 23 (step S102). This process switches the millimeter-wave communication device 23 to the on state. This start-up of the millimeter-wave communication device 23 is performed before the vehicle is parked on the parking lot of the building, for example.

On the other hand, in the data transmission device 1, the visible-light reception controller 17 of the controller 15 determines whether millimeter-wave communication is possible or not based on whether visible-light data has been received through an image sensor of the camera 11 or not (step S103). Step S103 may be performed before the vehicle is parked on the parking lot of the building, for example.

For example, if the visible-light reception controller 17 determines that visible-light data is not received, the visible-light reception controller 17 determines that millimeter-wave communication is impossible. On the other hand, if the visible-light reception controller 17 determines that visible-light data is received, the visible-light reception controller 17 determines that millimeter-wave communication is possible. As described above, the possible communication range of visible-light communication is set at a distance substantially equal to a possible communication range of millimeter-wave communication.

Figure 3A:
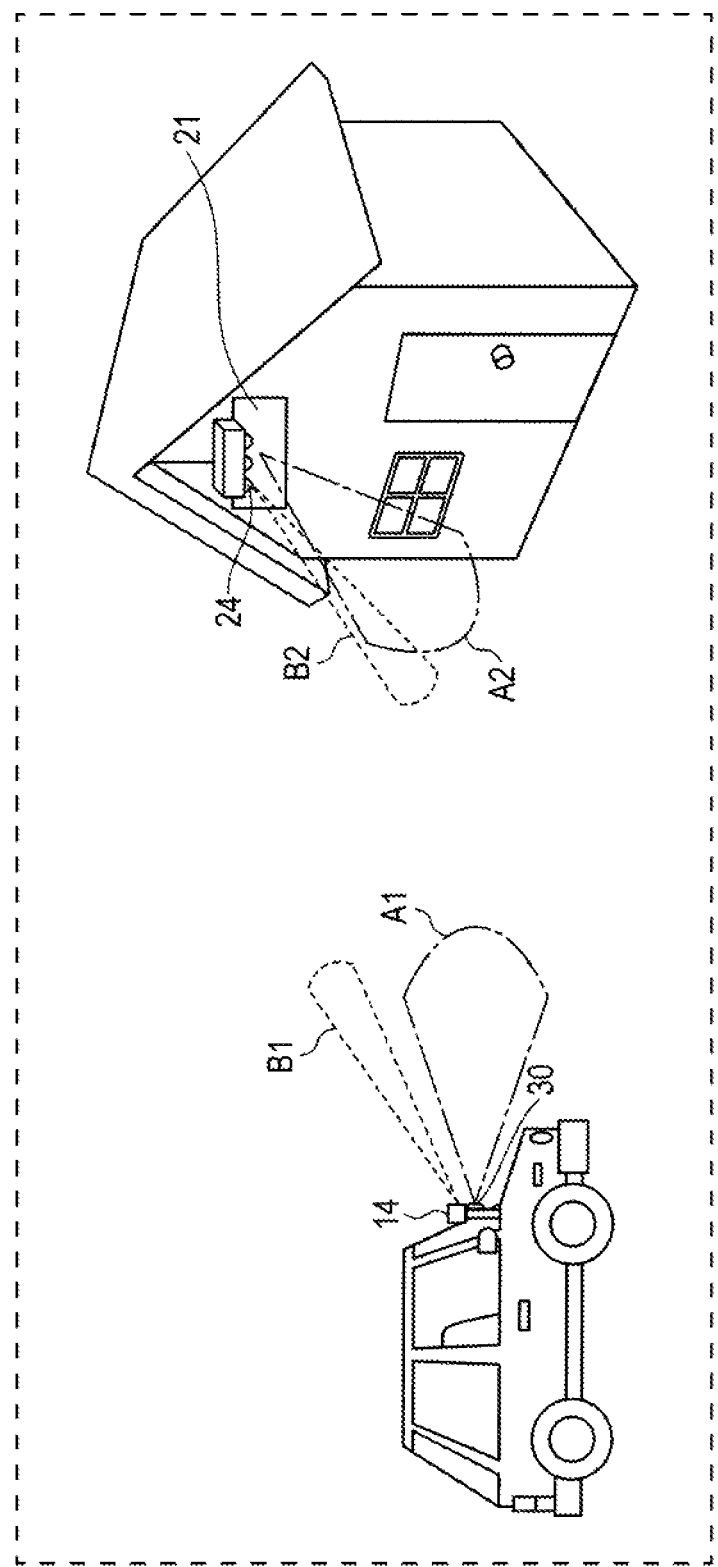
FIGS. 3A and 3B illustrate examples of states of a vehicle before and during parking according to first embodiment of the present disclosure.
Figure 3B:
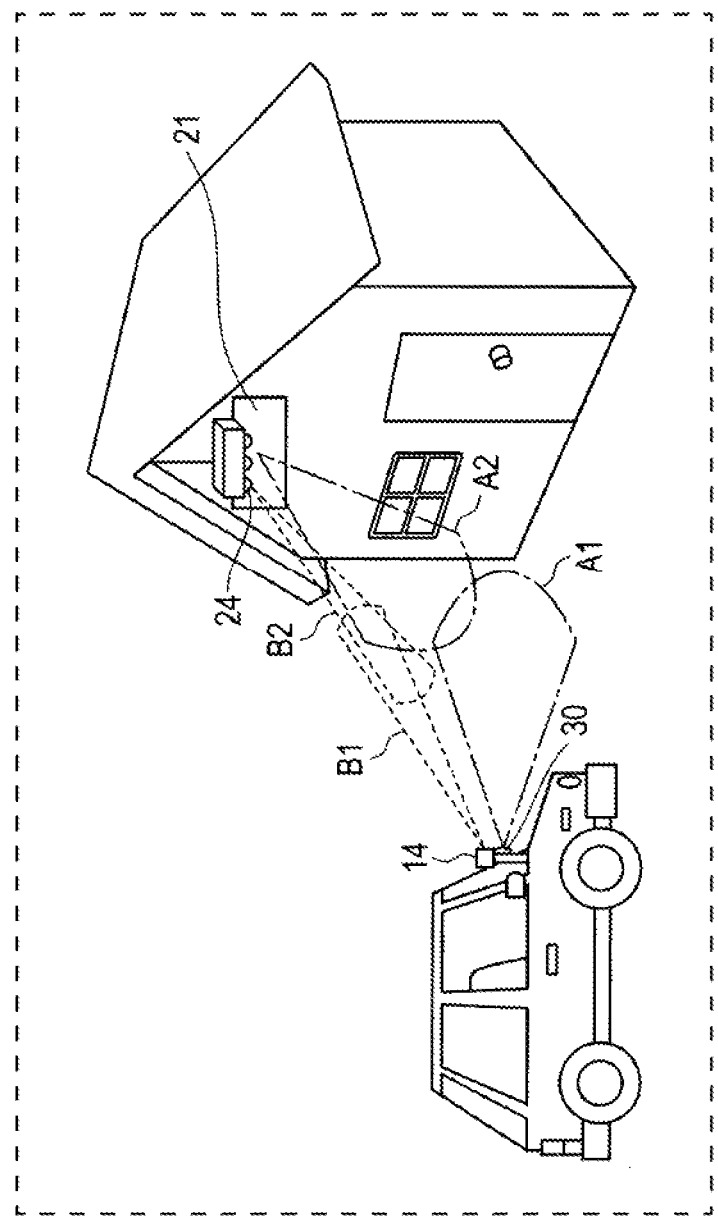

Here, examples of the case where the visible-light reception controller 17 determines that visible-light data is not received and the case where the visible-light reception controller 17 determines that visible-light data is received will be described with reference to FIGS. 3A and 3B. FIG. 3A illustrates a state before the vehicle is parked (or stops) on a parking lot of a building. FIG. 3B illustrates a state in which the vehicle is parked (or stops) on the parking lot of the building.

As illustrated in FIG. 3A, in the state before the vehicle is parked on the parking lot (not shown), a reception range A1 of visible-light data in an image sensor 30 is out of a transmission range A2 of visible-light data in the LED light source 21. Thus, the visible-light reception controller 17 determines that the visible-light data is not received. Specifically, it is determined that at least one of a transmission range B1 of image data in the antenna 14 or a reception range B2 of image data in the antenna 24 is out of the possible communication range of millimeter-wave communication or in a state in which a line-of-sight path of millimeter-wave communication is not obtained. Thus, the visible-light reception controller 17 determines that millimeter-wave communication is impossible.

As illustrated in FIG. 3B, in the state after the vehicle has been parked on the parking lot (not shown), the reception range A1 of visible-light data in the image sensor 30 overlaps the transmission range B2 of visible-light data in the LED light source 21. Thus, the visible-light reception controller 17 receives visible-light data. Specifically, it is determined that both of a transmission range B1 of image data in the antenna 14 and a reception range B2 of image data in the antenna 24 are within the possible communication range of millimeter-wave communication and in a state in which a line-of-sight path of millimeter-wave communication is obtained. Thus, the visible-light reception controller 17 determines that millimeter-wave communication is possible.

The description will now return to the flowchart of FIG. 2.

As a result of the determination at step S103, if millimeter-wave communication is impossible (step S103: NO), the flow returns to step S103. That is, the visible-light reception controller 17 performs the determination process at step S103 again.

If the visible-light reception controller 17 determines that communication of the millimeter-wave communication device 13 is impossible because the camera 11 does not receive visible-light data after parking of the vehicle, the data transmission device 1 may notify a user of a massage or the like indicating this situation. In response to this notification, a driver of the vehicle operates the vehicle so that the vehicle approaches the data reception device 2 or manually changes the orientation of an imaging unit of the camera 11. In this manner, the camera 11 can receive visible-light data.

On the other hand, if the determination at step S103 shows that millimeter-wave communication is possible (step S103: YES), the flow proceeds to step S104.

Subsequently, the millimeter-wave communication controller 18 switches the millimeter-wave communication device 13 to the on state, and then, performs a procedure for establishing wireless connection to the data reception device 2 through millimeter-wave communication using, for example, beamforming (step S104).

The millimeter-wave communication controller 28 performs a procedure for establishing wireless connection to the data transmission device 1 through millimeter-wave communication by using, for example, beamforming (step S105).

Through the processes at steps S104 and S105, wireless connection through millimeter-wave communication is established between the data transmission device 1 and the data reception device 2.

The procedures for establishing wireless connection at steps S104 and S105 are performed with a series of steps until transmission and reception of live data through millimeter-wave communication becomes possible (e.g., steps described in IEEE802.11ad).

Thereafter, the data controller 16 reads out image data from the memory 12 (step S106). The read-out image data is, for example, data on an image around the vehicle captured by the camera 11 in driving of the vehicle.

Subsequently, the millimeter-wave communication controller 18 controls the millimeter-wave communication device 13 in order to transmit the image data read out from the memory 12 to the data reception device 2 through millimeter-wave communication. The millimeter-wave communication device 13 transmits the image data to the data reception device 2 through the antenna 14 (step S107).

In the data reception device 2, the millimeter-wave communication device 23 receives image data transmitted from the data transmission device 1 through the antenna 24 (step S108). Then, the millimeter-wave communication device 23 outputs the received image data to the controller 25.

The data controller 26 of the controller 25 causes the memory 22 to store the image data transmitted from the millimeter-wave communication device 23 (step S109).

As described above, according to the first embodiment, wireless connection for performing millimeter-wave communication between the data transmission device 1 and the data reception device 2 is established using reception of visible-light data by the data transmission device 1 from the data reception device 2 as a trigger, and data is transferred from the data transmission device 1 to the data reception device 2 through millimeter-wave communication. In this manner, a labor for positioning for transmitting data through millimeter-wave communication from the data transmission device mounted on the vehicle is simplified so that data can be transferred at high speed.

Although the foregoing description is directed to the first embodiment of the present disclosure, the present disclosure is not limited to the description of the first embodiment. Variations will be described below.

<First Variation>

In the example described in the first embodiment, data, transmitted from the data transmission device 1 to the data reception device 2 is driving data (e.g., image data). However, the data is not limited to driving data and may be other data. For example, the data may be audio data or text data.

<Second Variation>

In the example described in the first embodiment, one data reception device 2 placed in the building receives data from one data transmission device 1 mounted on one vehicle. Alternatively, one data reception device 2 may communicate with a plurality of data transmission devices 1 (through visible-light communication and millimeter-wave communication) each mounted on a corresponding one of a plurality of vehicles.

<Third Variation>

In the example described in the first embodiment, the data reception device 2 has a function of an access point. Alternatively, the data transmission device 1 and the data reception device 2 may be wirelessly connected to each other through an access point placed near the LED light source 21. That is, the LED light source 21 may be placed outside the data reception device 2.

<Fourth Variation>

The data transmission device 1 of the first embodiment may have the function of adjusting the orientation of an imaging unit (e.g., a lens and an image sensor) of the camera 11.

Figure 4:
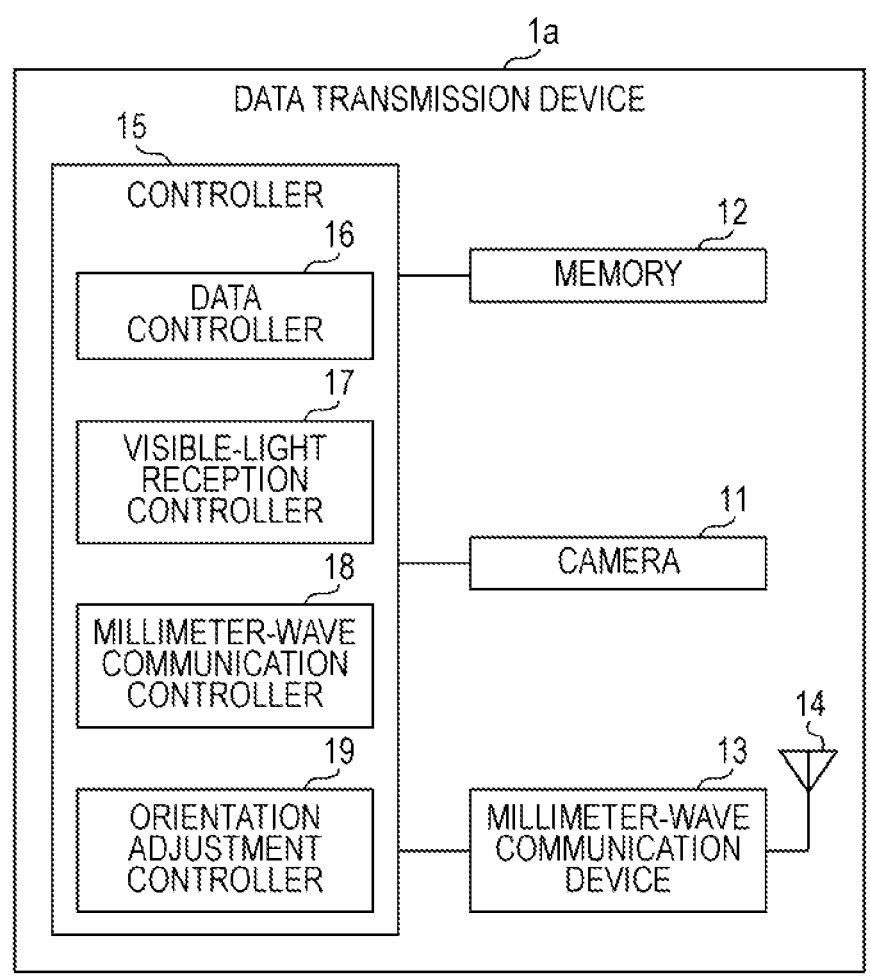
FIG. 4 is a block diagram illustrating an example configuration of a data transmission device according to a variation of the first embodiment of the present disclosure.

An example configuration of a data transmission device 1a according to a fourth variation will be described with reference to FIG. 4. FIG. 4 is a block diagram illustrating an example configuration of the data transmission device 1a according to the fourth variation. In FIG. 4, components also illustrated in FIG. 1 are denoted by the same reference characters, and description thereof will not be repeated. A data reception device 2 that communicates with the data transmission device 1a is similar to that illustrated in FIG. 1, and description thereof will not be repeated.

As illustrated in FIG. 4, a controller 15 of the data transmission device 1a further includes an orientation adjustment controller 19.

The orientation adjustment controller 19 adjusts the orientation of the imaging unit of the camera 11 to a predetermined direction (upward, downward, leftward, and rightward). For example, in a case where the visible-light reception controller 17 determines that the camera 11 fails to receive visible-light data and communication of the millimeter-wave communication device 13 is impossible, the orientation adjustment controller 19 adjusts the orientation of the imaging unit of the camera 11 until the camera 11 receives visible-light data. After the camera 11 has received visible-light data, the orientation adjustment controller 19 finishes the adjustment.

Figure 5:
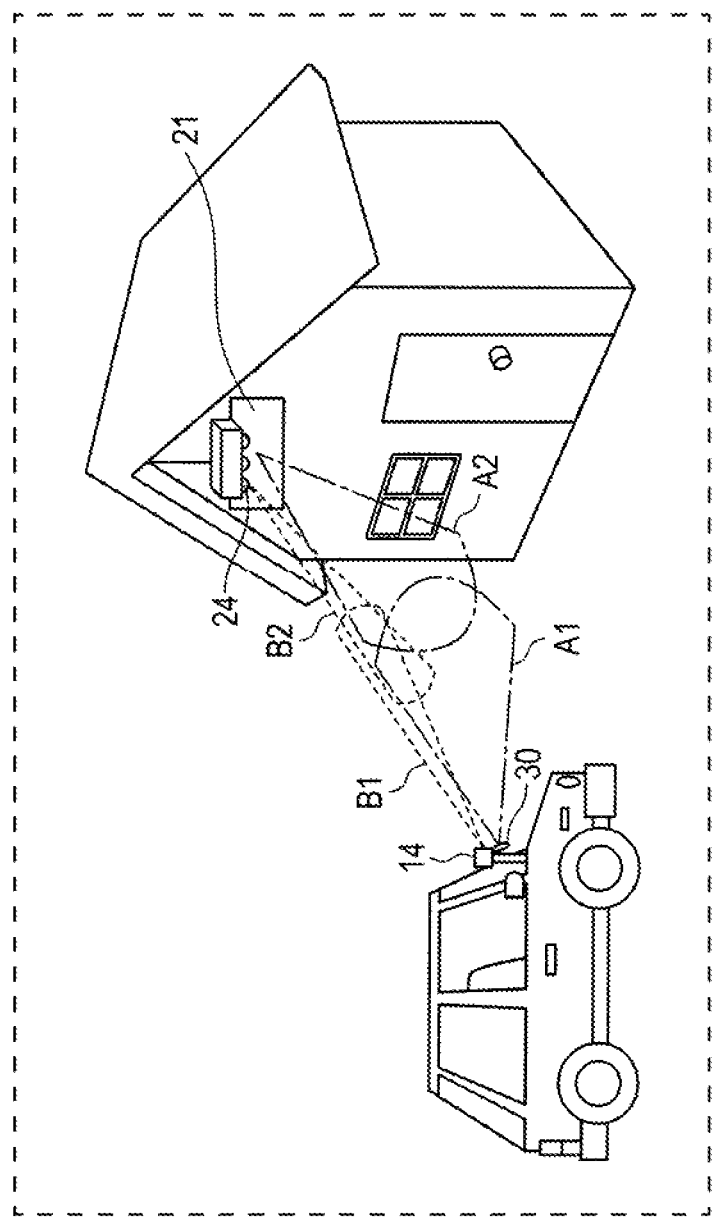
FIG. 5 illustrates an example of a state of a vehicle during parking according to the variation of the first embodiment of the present disclosure.

FIG. 5 illustrates an example of orientation of the image sensor 30 adjusted by the orientation adjustment controller 19. As illustrated in FIG. 5, the orientation of the image sensor 30 is adjusted upward (toward the LED light source 21). This adjustment causes the reception range A1 of visible-light data in the image sensor 30 to overlap the transmission range A2 of visible-light data in the LED light source 21 so that the camera 11 can receive visible-light data. Although FIG. 5 illustrates the image sensor, an unillustrated lens is also adjusted in a manner similar to the image sensor 30.

According to the foregoing variation, in a case where the camera 11 cannot receive visible-light data, a user does not need to manually adjust the orientation of the imaging unit of the camera 11.

The foregoing description is directed to the variations of the present disclosure. The variations may be suitably combined.

Second Embodiment

A second embodiment of the present disclosure will be described in detail with reference to FIGS. 6 and 7.

In the second embodiment, an LED light source 21b and a visible-light transmission controller 27b are provided instead of the camera 11 and the visible-light reception controller 17 as compared to the data transmission device 1 of the first embodiment, and a camera 11b and a visible-light reception controller 17b are provided instead of the LED light source 21 and the visible-light transmission controller 27 as compared to the data reception device 2 of the first embodiment.

For example, when a vehicle on which the data reception device 2b is mounted is parked on a parking lot of a building (e.g., a shop or an office) where a data transmission device 1b is placed, information can be obtained from the building.

First, an example configuration of a data transfer system 200 according to the second embodiment will be described with reference to FIG. 6. FIG. 6 is a block diagram illustrating an example configuration of the data transfer system 200 according to the second embodiment. In FIG. 6, components illustrated in FIG. 1 are denoted by the same reference characters, and the description thereof will not be repeated.

Figure 6:
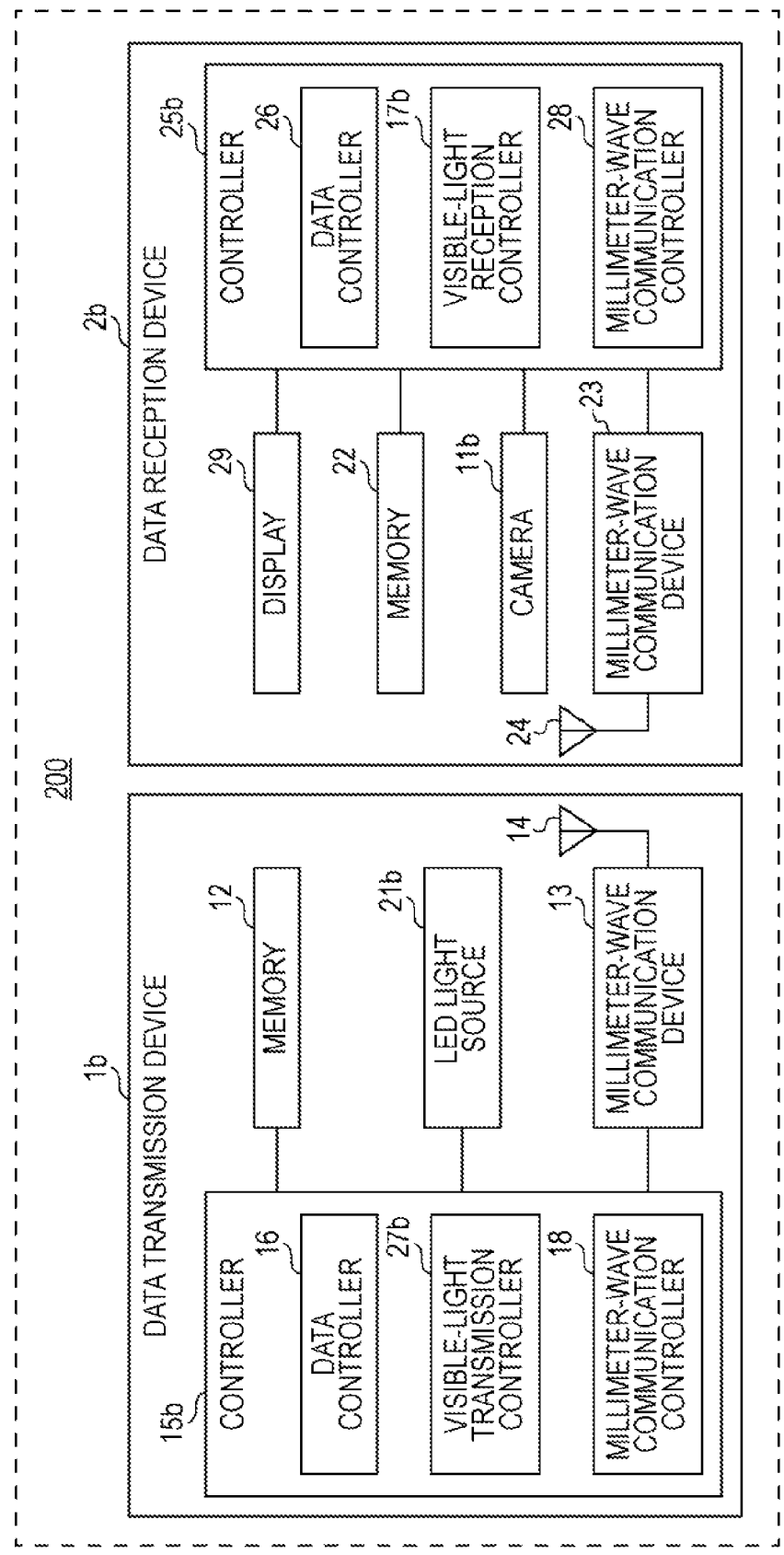
FIG. 6 is a block diagram illustrating an example configuration of a data transfer system according to a second embodiment of the present disclosure.
Figure 7:
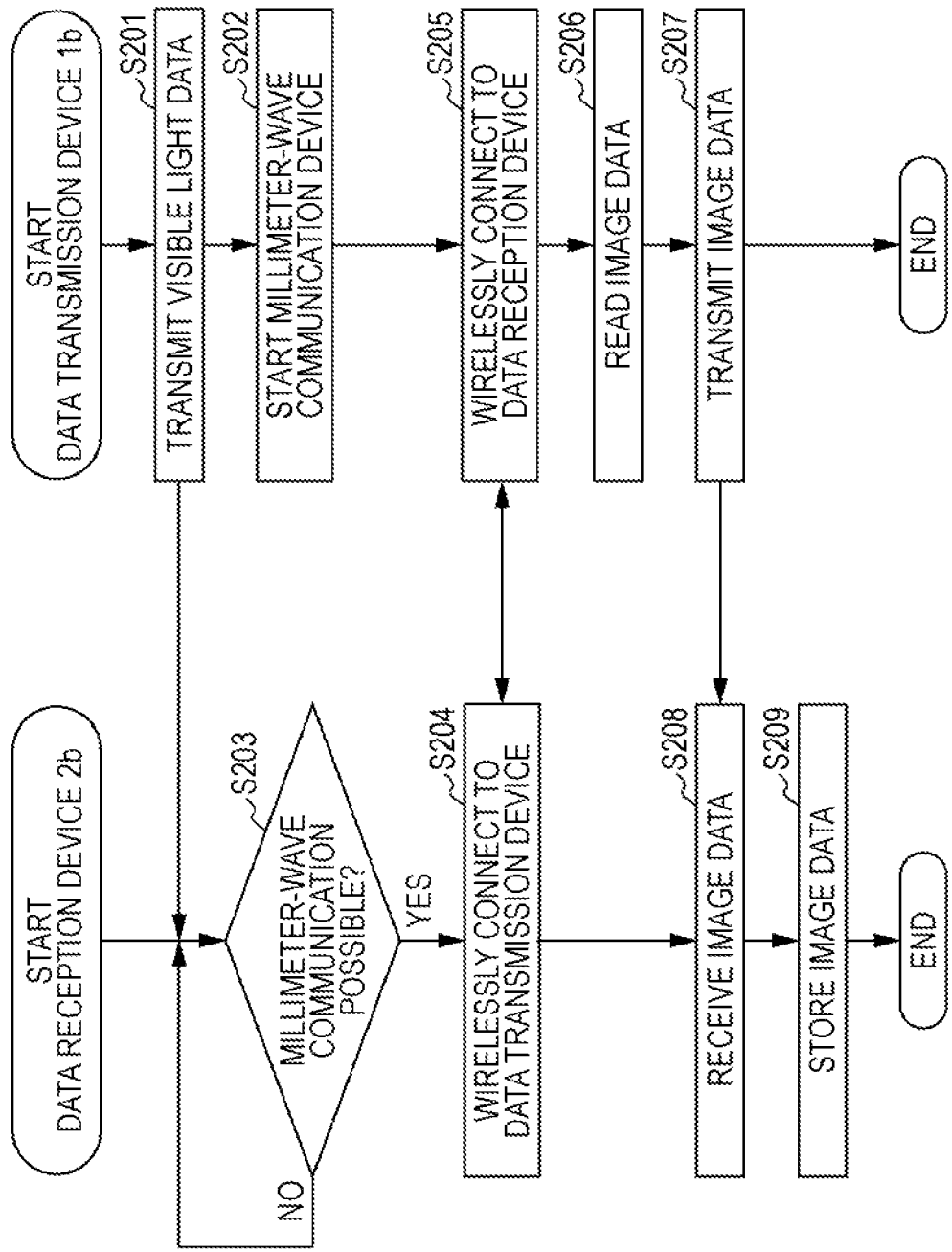
FIG. 7 is a sequence chart illustrating an example of a flow of operation of the data transfer system according to the second embodiment of the present disclosure.

As illustrated in FIG. 6, the data transfer system 200 includes the data transmission device 1b and a data reception device 2b. The data transmission device 1b is, for example, a wireless LAN access point placed in, for example, a building (e.g., an office). The data reception device 2b is, for example, a video playback device (e.g., a DVD player or a BD player) mounted on a vehicle.

First, a configuration of the data transmission device 1b will be described.

As illustrated in FIG. 6, the data transmission device 1b includes the LED light source 21b, a memory 12, a millimeter-wave communication device 13, an antenna 14, and a controller 15b. The controller 15b includes a data controller 16, the visible-light transmission controller 27b, and a millimeter-wave communication controller 18. Each of the LED light source 21b and the visible-light transmission controller 27b has the same function as a corresponding one of the LED light source 21 and the visible-light transmission controller 27 illustrated in FIG. 1.

The memory 12 stores, for example, image data concerning corporate advertising and image data concerning traffic, as data to be transmitted to the data reception device 2b.

The data transmission device 1b only needs to include the LED light source 21b, the memory 12, the millimeter-wave communication device 13, the antenna 14, and the controller 15b, and is not limited to a wireless LAN access point.

In the data transmission device 1b, the LED light source 21b and the visible-light transmission controller 27b may be collectively referred to as a "visible-light transmitter." In the data transmission device 1b, the millimeter-wave communication device 13, the antenna 14, and the millimeter-wave communication controller 18 may be collectively referred to as a "millimeter-wave communicator."

The foregoing description is directed to the configuration of the data transmission device 1b.

Next, a configuration of the data reception device 2b will be described.

As illustrated in FIG. 6, the data reception device 2b includes the camera 11b, a memory 22, a millimeter-wave communication device 23, an antenna 24, the controller 25b, and a display 29. The controller 25b includes a data controller 26, the visible-light reception controller 17b, and a millimeter-wave communication controller 28. Each of the camera 11b and the visible-light reception controller 17b has the same function as a corresponding one of the camera 11 and the visible-light reception controller 17 illustrated in FIG. 1.

The display 29 is a display device such as a display screen. The display 29 displays image data received from the data transmission device 1b.

In the example of FIG. 6, the display 29 is included in the data reception device 2b. Alternatively, the display 29 may be placed outside the data reception device 2b.

The data reception device 2b only needs to include the camera 11b, the memory 22, the millimeter-wave communication device 23, the antenna 24, the controller 25b, and the display 29, and is not limited to a video playback device.

In the data reception device 2b, the camera 11b and the visible-light reception controller 17b may be collectively referred to as a "visible-light receiver." In the data reception device 2b, the millimeter-wave communication device 23, the antenna 24, and the millimeter-wave communication controller 28 may be collectively referred to as a "millimeter-wave communicator."

The foregoing description is directed to the configuration of the data reception device 2b.

Next, an example of operation of the data transfer system 100 (the data transmission device 1b and the data reception device 2b) according to the second embodiment will be described with reference to FIG. 7. FIG. 7 is a sequence chart illustrating an example of a flow of operation of the data transfer system 200 according to the second embodiment.

In the example described below, a vehicle on which the data reception device 2b is mounted is parked on a parking lot of a building (e.g., a shop or an office) where the data transmission device 1 is placed.

First, in the data transmission device 1b, the LED light source 21b is controlled by the visible-light transmission controller 27b of the controller 15 to transmit visible-light data (step S201). The transmission of visible-light data is performed before the vehicle is parked on the parking lot of the building, for example.

In the data transmission device 1b, the millimeter-wave communication controller 18 starts the millimeter-wave communication device 13 (step S202). This process switches the millimeter-wave communication device 13 to the on state. The start-up of the millimeter-wave communication device 13 is performed before the vehicle is parked on the parking lot of the building, for example.

On the other hand, in the data reception device 2b, the visible-light reception controller 17b of the controller 25b determines whether communication of the millimeter-wave communication device 23 is possible or not based on whether visible-light data is received through an image sensor of the camera 11b or not (step S203). The determination is performed before the vehicle is parked on the parking lot of the building, for example. The detail of the determination has been already described in the first embodiment, and thus, is not repeated.

As a result of the determination at step S203, if communication of the millimeter-wave communication device 23 is impossible (step S203: NO), the flow returns to step S203. That is, the visible-light reception controller 17b performs the determination at step S203 again.

If the visible-light reception controller 17b determines that the camera 11b fails to receive visible-light data and communication of the millimeter-wave communication device 23 is impossible, the data reception device 2b may notify a use of a message or the like indicating this situation. In response to this notification, a driver of the vehicle operates the vehicle so that the vehicle approaches the data transmission device 1b or manually changes the orientation of the imaging unit of the camera 11b. With this change, the camera 11b can receive visible-light data.

On the other hand, if the determination at step S203 shows that communication of the millimeter-wave communication device 23 is possible (step S203: YES), the flow proceeds to step S204.

Next, the millimeter-wave communication controller 28 of the data reception device 2b switches the millimeter-wave communication device 23 to the on state, and then, performs a procedure for establishing, wireless connection to the data transmission device 1b through millimeter-wave communication by using, for example, beamforming (step S204).

The millimeter-wave communication controller 18 of the data transmission device 1b performs a procedure for establishing wireless connection to the data reception device 2b through millimeter-wave communication by using, for example, beamforming (step S205).

Through the processes at steps S204 and S205, wireless connection through millimeter-wave communication is established between the data transmission device 1b and the data reception device 2b.

The procedures for establishing wireless connection at steps S204 and S205 are performed with a series of steps until transmission and reception of live data through millimeter-wave communication becomes possible (e.g., steps described in IEEE802.11ad).

Thereafter, the data controller 16 reads out image data from the memory 12 (step S206). The read-out image data is, for example, image data concerning a corporate advertising.

Thereafter, the millimeter-wave communication controller 18 controls the millimeter-wave communication device 13 in order to transmit the image data read out from the memory 12 to the data reception device 2b through millimeter-wave communication. The millimeter-wave communication device 13 transmits the readout image data to the data reception device 2b through the antenna 14 (step S207).

In the data reception device 2b, the millimeter-wave communication device 23 receives the image data transmitted from the data transmission device 1b through the antenna 24 (step S208). Then, the millimeter-wave communication device 23 outputs the received image data to the controller 25b.

The data controller 26 of the controller 25b causes the memory 22 to store the image data received from the millimeter-wave communication device 23 (step S209). The data controller 26 reads, at a predetermined timing, the image data received from the memory 22 and causes the display 29 to display the received image data. In this manner, a passenger (a driver or an occupant) can visually recognize information about shops that is the received image data.

As described above, according to the second embodiment, wireless connection for millimeter-wave communication between the data reception device 2b and the data transmission device 1b is established using reception of visible-light data by the data reception device 2b from the data transmission device 1b as a trigger, and data is transferred from the data transmission device 1b to the data reception device 2b through millimeter-wave communication. In this manner, a labor for positioning for transmitting data through millimeter-wave communication from the data transmission device 1b placed in a shop is simplified so that data can be transferred at high speed.

Although the foregoing description is directed to the second embodiment of the present disclosure, the present disclosure is not limited to the description of the second embodiment, and various changes and modifications may be made. For example, variations of the first embodiment may be applied to the second embodiment when necessary.

Summary of Embodiments

A data transfer system according to a first aspect of the present disclosure is a data transfer system including; a data transmission device; and a data reception device. The data transmission device includes a visible-light receiver that determines whether to receive visible-light data from the data reception device or not, a first memory from which accumulated data is read out in a case where the visible-light receiver receives the visible-light data, and a first millimeter-wave communicator that, in a case where the visible-light receiver receives the visible-light data, establishes wireless connection for communication with the data reception device using a frequency in a millimeter band, and transmits the readout data to the data reception device. The data reception device includes a visible-light transmitter that transmits the visible-light data to the data transmission device, a second millimeter-wave communicator that establishes wireless connection for communication with the data transmission device using a frequency in a millimeter band, and receives data transmitted from the data transmission device, and a second memory that stores the received data.

A data transfer system according to a second aspect of the present disclosure is based on the data transfer system according to the first aspect. In the data transfer system, the data transmission device is a drive recorder mounted on a vehicle, and the readout data includes an image captured by a camera mounted on the vehicle in driving.

A data transfer system according to a third aspect of the present disclosure is based on the data transfer system according to the first aspect. In the data transfer system, a possible communication range of the visible-light data is equal to a possible communication range of communication using the frequency in the millimeter band.

A data transfer system according to a fourth aspect of the present disclosure is based on the data transfer system according to the first aspect. In the data transfer system, in a case where the visible-light receiver receives the visible-light data, the visible-light receiver determines that (i) the data transmission device is present within a possible communication range of communication using the frequency in the millimeter band, and (ii) a line-of-sight path of communication using the frequency in the millimeter band is obtained between the data transmission device and the data reception device.

A data transfer system according to a fifth aspect of the present disclosure is based on the data transfer system according to the first aspect. In the data transfer system, the data transmission device includes an orientation adjuster that adjusts an orientation of an imaging unit of a camera for receiving the visible-light data to enable the visible-light receiver to receive the visible-light data.

A data transfer system according to a sixth aspect of the present disclosure is a data transfer system including: a data transmission device; and a data reception device. The data transmission device includes a visible-light transmitter that transmits visible-light data to the data reception device, and a first millimeter-wave communicator that establishes wireless connection for communication with the data reception device using a frequency in a millimeter band, and transmits data accumulated in a first memory to the data reception device. The data reception device includes a visible-light receiver that determines whether to receive the visible-light data from the data transmission device or not, a second millimeter-wave communicator that, in a case where the visible-light receiver receives the visible-light data, establishes wireless connection for communication with the data transmission device using a frequency in a millimeter band, and receives data transmitted from the data transmission device, and a display that displays the received data.

A data transfer system according to a seventh aspect of the present disclosure is based on the data transfer system according to the sixth aspect. In the data transfer system, the data reception device is a video playback device mounted on a vehicle, and the received data includes an image concerning advertising or traffic.

A data transfer system according to an eighth aspect of the present disclosure is based on the data transfer system according to the sixth aspect. In the data transfer system, a possible communication range of the visible-light data is equal to a possible communication range of communication using the frequency in the millimeter band.

A data transfer system according to a ninth aspect of the present disclosure is based on the data transfer system according to the sixth aspect. In the data transfer system, in a case where the visible-light receiver receives the visible-light data, the visible-light receiver determines that (i) the data reception device is present within a possible communication range of communication using the frequency in the millimeter band, and (ii) a line-of-sight path of communication using the frequency in the millimeter band is obtained between the data transmission device and the data reception device.

A data transfer system according to a tenth aspect of the present disclosure is based on the data transfer system according to the sixth aspect. In the data transfer system, the data reception device further includes an orientation adjuster that adjusts an orientation of an imaging unit of a camera for receiving the visible-light data to enable the visible-light receiver to receive the visible-light data.

A data transmission device according to an eleventh aspect of the present disclosure is a data transmission device includes: a visible-light receiver that determines whether to receive visible-light data from the data reception device or not; a first memory from which accumulated data is read out in a case where the visible-light receiver receives the visible-light data; and a millimeter-wave communicator that, in a case where the visible-light receiver receives the visible-light data, establishes wireless connection for communication with the data reception device using a frequency in a millimeter band, and transmits the readout data to the data reception device.

A data reception device according to a twelfth aspect of the present disclosure is a data reception device includes: a visible-light receiver that determines whether to receive visible-light data from the data transmission device or not; a millimeter-wave communicator that, in a case where the visible-light receiver receives the visible-light data, establishes wireless connection for communication with the data transmission device using a frequency in a millimeter band, and receives data transmitted from the data transmission device; and a display that displays the received data.

Although the foregoing description is directed to the embodiments with reference to the drawings, the present disclosure is, of course, not limited to these embodiments. It would be obvious to those skilled in the art that the embodiments can be changed or modified variously within the scope defined by the claims, and it would be understood these change and modification belong to the technical range of the disclosure. Components of the embodiments may be combined in any manner within the gist of the disclosure.

In the foregoing embodiments, the present disclosure is directed to the example in which the configuration uses hardware, but the present disclosure may be implemented by software in cooperation with hardware.

The functional blocks used in the description of the embodiments are typically implemented as LSI devices, which are integrated circuits including input terminals and output terminals. The functional blocks may be formed as individual chips, or a part or all of the functional blocks may be integrated into a single chip. Although the term "LSI" is used herein, the terms including "IC," "system LSI," "super LSI," or "ultra LSI" may be used as well depending on the degree of integration.

In addition, the circuit integration is not limited to LSI and may be achieved by dedicated circuitry or a general-purpose processor. After fabrication of LSI devices, a field programmable gate array (FPGA), which is programmable, or a reconfigurable processor, which allows reconfiguration of connections and settings of circuit cells in LSI may be used.

Should a circuit integration technology replacing LSI appear as a result of advancement in semiconductor technology or other technologies derived from the technology, the functional blocks could be integrated using such a technology. Another possibility is the application of biotechnology and/or the like.

A data transfer system, a data transmission device, and a data reception device according to the present disclosure can be useful for high-speed data transfer.

What is claimed is:

1. A data transfer system comprising:
a data transmission device; and
a data reception device, wherein
the data transmission device includes
a visible-light receiver that determines whether visible-light data including identification (ID) information of the data reception device is received or not,
a first memory from which accumulated data is read out in a case where the visible-light receiver receives the visible-light data including the ID information of the data reception device, and
a first millimeter-wave communicator that, in a case where the visible-light receiver receives the visible-light data including the ID information of the data reception device, establishes wireless connection for communication with the data reception device using a frequency in a millimeter band, and transmits the accumulated data to the data reception device, and
the data reception device includes
a visible-light transmitter that transmits the visible-light data including the ID information of the data reception device to the data transmission device,
a second millimeter-wave communicator that establishes wireless connection for communication with the data transmission device using the frequency in the millimeter band, and receives the accumulated data transmitted from the data transmission device, and
a second memory that stores the received accumulated data.

2. The data transfer system according to claim 1, wherein the data transmission device is a drive recorder mounted on a vehicle, and
the accumulated data includes an image captured by a camera mounted on the vehicle.

3. The data transfer system according to claim 1, wherein a possible communication range of the visible-light data including the ID information of the data reception device is substantially equal to a possible communication range of communication using the frequency in the millimeter band.

4. The data transfer system according to claim 1, wherein in a case where the visible-light receiver receives the visible-light data including the ID information of the data reception device, the visible-light receiver determines that
(i) the data transmission device is present within a possible communication range of communication using the frequency in the millimeter band, and
(ii) a line-of-sight path of communication using the frequency in the millimeter band is obtained between the data transmission device and the data reception device.

5. The data transfer system according to claim 1, wherein the data transmission device includes
an orientation adjuster that adjusts an orientation of an imaging unit of a camera for receiving the visible-light data including the ID information of the data reception device to enable the visible-light receiver to receive the visible-light data including the ID information of the data reception device.

6. A data transfer system comprising:
a data transmission device; and
a data reception device, wherein
the data transmission device includes
a visible-light transmitter that transmits visible-light data including identification (ID) information of the data transmission device to the data reception device, and
a first millimeter-wave communicator that establishes wireless connection for communication with the data reception device using a frequency in a millimeter band, and transmits data accumulated in a first memory to the data reception device, and
the data reception device includes
a visible-light receiver that determines whether the visible-light data including the ID information of the data transmission device is received or not,
a second millimeter-wave communicator that, in a case where the visible-light receiver receives the visible-light data including the ID information of the data transmission device, establishes wireless connection for communication with the data transmission device using the frequency in the millimeter band, and receives data transmitted from the data transmission device, and
a display that displays the received data.

7. The data transfer system according to claim 6, wherein the data reception device is a video playback device mounted on a vehicle, and
the received data includes an image concerning advertising or traffic.

8. The data transfer system according to claim 6, wherein a possible communication range of the visible-light data including the ID information of the data transmission device is substantially equal to a possible communication range of communication using the frequency in the millimeter band.

9. The data transfer system according to claim 6, wherein in a case where the visible-light receiver receives the visible-light data including the ID information of the data transmission device, the visible-light receiver determines that
(i) the data reception device is present within a possible communication range of communication using the frequency in the millimeter band, and
(ii) a line-of-sight path of communication using the frequency in the millimeter band is obtained between the data transmission device and the data reception device.

10. The data transfer system according to claim 6, wherein the data reception device further includes
an orientation adjuster that adjusts an orientation of an imaging unit of a camera for receiving the visible-light data including the ID information of the data transmission device to enable the visible-light receiver to receive the visible-light data including the ID information of the data transmission device.

11. A data transmission device comprising:
a visible-light receiver that determines whether visible-light data including identification (ID) information of a data reception device is received or not;
a first memory from which accumulated data is read out in a case where the visible-light receiver receives the visible-light data; and
a millimeter-wave communicator that, in a case where the visible-light receiver receives the visible-light data, establishes wireless connection for communication with the data reception device using a frequency in a millimeter band, and transmits the accumulated data to the data reception device.

12. A data reception device comprising:

a visible-light receiver that determines whether visible-light data including identification (ID) information of a data transmission device is received or not;

a millimeter-wave communicator that, in a case where the visible-light receiver receives the visible-light data, establishes wireless connection for communication with the data transmission device using a frequency in a millimeter band, and receives data transmitted from the data transmission device; and a display that displays the received data.

* * * * *